United States Patent
Lee et al.

(10) Patent No.: US 10,691,871 B2
(45) Date of Patent: Jun. 23, 2020

(54) DEVICES, METHODS, AND SYSTEMS TO CONVERT STANDARD-TEXT TO ANIMATED-TEXT AND MULTIMEDIA

(71) Applicant: The Existence, Inc., San Francisco, CA (US)

(72) Inventors: Kenneth Choi Lee, San Francisco, CA (US); Venkat Krishnaraj, San Francisco, CA (US)

(73) Assignee: The Existence, Inc., San Francisco, CA (US)

( * ) Notice: Subject to any disclaimer, the term of this patent is extended or adjusted under 35 U.S.C. 154(b) by 73 days.

(21) Appl. No.: 15/955,560

(22) Filed: Apr. 17, 2018

(65) Prior Publication Data

US 2018/0300291 A1  Oct. 18, 2018

Related U.S. Application Data

(60) Provisional application No. 62/486,233, filed on Apr. 17, 2017.

(51) Int. Cl.
| | |
|---|---|
| *G06F 17/00* | (2019.01) |
| *G06F 40/103* | (2020.01) |
| *G06F 40/14* | (2020.01) |
| *G06F 40/205* | (2020.01) |
| *G06F 40/284* | (2020.01) |

(52) U.S. Cl.
CPC ............ *G06F 40/103* (2020.01); *G06F 40/14* (2020.01); *G06F 40/205* (2020.01); *G06F 40/284* (2020.01)

(58) Field of Classification Search
CPC .. G06F 17/2247; G06F 17/211; G06F 40/103; G06F 40/284
USPC .......................................... 715/204, 200, 234
See application file for complete search history.

(56) References Cited

U.S. PATENT DOCUMENTS

| | | | | |
|---|---|---|---|---|
| 6,396,500 | B1 * | 5/2002 | Qureshi | ................. G06T 11/00 345/473 |
| 8,878,857 | B2 * | 11/2014 | Graffagnino | ........ G06F 17/2205 345/473 |
| 9,269,176 | B2 * | 2/2016 | Blas, Jr. | ................. G06T 13/80 |
| 2010/0238180 | A1 * | 9/2010 | Kang | ................. G06F 17/2247 345/473 |
| 2017/0098324 | A1 * | 4/2017 | Srinivasan | .............. G10L 13/08 |

* cited by examiner

*Primary Examiner* — Manglesh M Patel
(74) *Attorney, Agent, or Firm* — Levine Bagade Han LLP

(57) ABSTRACT

Devices, methods, and systems for automatic text segmentation, text animation, and multimedia text presentation are provided. In one embodiment, a computer-implemented method allowing a user to segment and set text animation styles and set the timing of text such that the text appears according to the user's desired customizable settings is disclosed. In another embodiment, a computer-implemented method for displaying text such that natural reading pauses and user-defined animation and audio-effects are added to the text to facilitate and enhance the reading experience is disclosed.

17 Claims, 11 Drawing Sheets

317  319

I'm just tryin to stay above water y'know
Just stay busy, stay workin
Puff told me like, the key to this joint
The key to staying, on top of things
is treat everything like it's your first project, knahmsayin
Like it's your first day like back when you was an intern
Like, that's how you try to treat things like, just stay hun 318
320
322
324
326
328
329
330
332
334
336
338

| wordAnim Commands | Behavior |
| --- | --- |
| 'bgImage' | {'params': 'filename', 'text':'Sets the background image to the valid image file', 'ex':'bgImage:background.jpg'} |
| 'bgColor' | {'params': 'color', 'text':'Sets the background to the specified CSS color', 'ex':'bgColor:#ffffff or bgColor:#fff or bgColor:white'} |
| 'bgVideo' | {'params': 'filename', 'text':'Sets the background video to the MP4 video file', 'ex':'bgVideo:video.m4v'} |
| 'bgAudio' | {'params': 'filename', 'text':'Sets the background audio to the MP4 audio file', 'ex':'bgAudio:song.m4a'} |
| 'globalAudio' | {'params': 'filename', 'text':'Sets the background audio for all graphs to the MP4 audio file. The audio file starts playing automatically.', 'ex':'globalAudio:song.m4a'} |
| 'textColor' | {'params': 'color', 'text':'Sets the text color to the specified CSS color', 'ex':'textColor:#ffffff or textColor:#fff or textColor:white'} |
| 'wordAnim' | {'params': 'animationType', 'text':'Sets the animation entries of all words to the specified animation type. Defaults to fadeIn. For all types, visit https://daneden.github.io/animate.css/', 'ex':'wordAnim:bounce'} |
| 'charAnim' | {'params': 'animationType', 'text':'Sets the animation entries for individual characters to the specified animation type. Defaults to fadeIn. For all types, visit https://daneden.github.io/animate.css/', 'ex':'charAnim:flip'} |
| 'setSpeed' | {'params': 'animationSpeed', 'text':'Use this to control the speed of all animations. Note that values between 0 and 1.0 speed the animation, values above 1.0 slow the animations, and at 0, animations get effectively disabled. Defaults to 1.0', 'ex':'setSpeed:0.5 to make animations twice as fast'} |
| 'delay' | {'params':'time in millis', 'text':'This will delay the start of the animation of the subsequent elements relative to previous elements to the specified delay. Defaults to 100', 'ex':'delay:1000 for a delay of 1000 milliseconds or 1 second'} |
| 'absDelay' | {'params':'time in millis', 'text':'This will delay the start of the animation of the subsequent elements relative to the start of the graph to the specified delay. Disabled by default', 'ex':'absDelay:1000 for a delay of 1000 milliseconds or 1 second'} |
| 'newline' | {'params':'none', 'text':'This will insert a newline. Note that this command should be on a new line on the editor window as well', 'ex':'lorem ipsum<br>newline<br>dolor sit amet'}, |
| 'wait' | {'params':'none or time in millis', 'text':'This inserts a pause of the specified time. If not specified, it will wait until user interaction', 'ex':'wait to wait until user hits a key or wait:10000 to wait for 10 seconds'} |
| 'textBehavior' | {'params':'behaviorType', 'text':'This modifies the behavior of the word parser, defaults to "none". Supported type is "autoQuote" that automatically detects quotes and inserts waits for a natural reading experience of a dialog', 'ex':'textBehavior:none or textBehavior:autoQuote'} |

FIG. 5

DEVICES, METHODS, AND SYSTEMS TO CONVERT STANDARD-TEXT TO ANIMATED-TEXT AND MULTIMEDIA

CROSS-REFERENCE TO RELATED APPLICATION

This application claims the benefit of U.S. Provisional Application No. 62/486,233, filed Apr. 17, 2017, the content of which is incorporated herein by reference in its entirety.

TECHNICAL FIELD

The present disclosure relates generally to the field of computer graphics and, more specifically, to devices, methods, and systems for automatic text segmentation, text animation, and multimedia text presentation.

BACKGROUND

Reading has become a bit of a lost art. This is most true in storytelling and other written texts that are created by authors who want to evoke emotion in readers. Because other media (e.g. videos, apps, digital games, augmented or virtual environments) engage more senses, they do a much better job of drawing emotional value out of people. Written pages of printed or digital words can't compare. Especially hard are long passages of text that are simply blocks of words on a page, page after page. These are often hard to follow, easy for a reader to lose his or her place or interest over time, and unstimulating as a multi-sensory experience.

Animated text and merging media with text on a digital display can be used to: segment written text to make it easier to read, create emphasis on written words, and provide a richer, more emotional, reading experience. However, no tools or software today allow written authors to create such animated, media-rich texts without significant coding and development resources.

Current methods and software that mimic or facilitate one's reading experience through the use of animated text include dynamic flashing of one word at a time. Flashing one word at a time with only one word showing on the screen at all time has been shown to be associated with improving the speed of one's reading. However, flashing one word at a time does not provide the user or author with an option to also allow for a natural reading experience, one in which the eyes move from one side of the screen/book/page to the other. Therefore, flashing one word after another at the same location does not facilitate a natural and comfortable reading experience for those not looking to increase their reading speed. Furthermore, other forms of animated text are used as graphical and visually pleasing enhancements that are usually created to serve as a title or banner.

Other methods allows the adjustment of more than one word being flashed at a time contemplated for improving reading speeds or to enable oneself to see the current location within a document by stopping the flashing of words and presenting the text in normal multi-line fashion with the current word highlighted.

However, currently, there is no simple way to create a real-time playback display of passages of text, wherein the text would animate in (and out) on a display in a way that is easily customizable to execute one word, a couple of words, sentences, or even paragraphs to animate at a time. Additionally, there is no easy customizable way of animating words at a cadence consistent with an author's intentions, or to create a more natural reading experience, such as creating pauses for standard text-based characters such as line breaks, tabs, and punctuation.

Further, there is no simple way for a user to customize the execution of certain words to animate, to execute audio or video to play in the background when desired, and to execute other animating features simply by pasting the passage of text into an input textbox and to mark particular words or phrases such that desired animating features associated with the appearance of that word or phrase appear on the display. Furthermore, there is no simple way for animating the words onto a screen based on an inputted audio file wherein the words would appear at the same speed at which the words were spoken in the audio file.

Given that the standard HTML elements that are used to code websites in browsers are the lowest-level components of a webpage that can be styled, they are also the lowest-level components that can be animated. And while text does not constitute as an element in and of itself, a block of text may be designated as a text node but is an unstylable, lower-level component that must be contained by an element. However, the browser does not subdivide text nodes into grammatical components, such that there is no way to access individual letters, words, or sentences. In general, exploding a body of text into character elements and animating them manually is a tedious process.

Consequently, to animate text on a letter, word, or sentence basis using HTML, you have to break each text node into separate text nodes, and then wrap each of these in a new element and then they can be animated. However, based on the prior art, that requires manually wrapping the text into elements, which is tedious and inefficient. Therefore, it actually has been considered widely as bad practice, given that the web browser using HTML code is a medium that prioritizes function over form, and text animation is largely about form.

Thus, HTML text animation has not been contemplated as a useful and viable tool, until the present application, which contemplates the automation of the process, making it not only user-friendly but also automated such that a user does not need to manually wrap the text into elements. And while HTML text animation is not as dynamic and multi-faceted as animated text created from motion design software, for the purposes of a clean and easy interface that allows a user to quickly and easily manipulate static text into animated text, the present application provides the novel solution based on a simple and powerful tool for animating text, and outputting it for consumption on digital displays.

Therefore, it has not yet been contemplated to automatically animate text at the HTML level, until the present application, which helps with reading long passages of text using a real-time playback display method, device, and software that converts static text to animated text that is shown in a way that facilitates and enhances a natural reading experience, and allows for authors or writers of text to better communicate and evoke emotion in readers.

SUMMARY

The present disclosure relates to a computer-implemented method for displaying animated text wherein a user is able to segment and set animation styles and set the timing of the text such that the text appears according to the user's desired customizable settings. In some variations, the method comprises obtaining digital content comprising text data via a smart text editor and automatically parsing the text data into at least one paragraph. The at least one paragraph can comprise a set of words. The computer-implemented method can further comprise automatically tokenizing each word of the set of words and creating a stream of tokenized words comprising at least one tokenized word comprising a markup command. The markup command can dictate a behavior rule of the at least one tokenized word.

More specifically, the present disclosure relates a computer-implemented method comprising: obtaining, using one or more processors of a computing device, digital content comprising text data via a smart text editor; automatically parsing, using the one or more processors, the text data into at least one paragraph, wherein the at least one paragraph comprises a set of words; automatically tokenizing, using the one or more processors, each word of the set of words, creating a stream of tokenized words comprising at least one tokenized word comprising a markup command, wherein the markup command dictates a behavior rule of the at least one tokenized word; scanning, using the one or more processors, the stream of tokenized words, wherein scanning the stream of tokenized words comprises: (i) building HTML nodes for all subsequent tokenized words based on a pre-existing behavior rule when the pre-existing markup command is determined to be present, (ii) at least one of replacing the pre-existing markup command with a new markup command and adding the new markup command to the pre-existing markup command when the new markup command is determined to be present, (iii) building corresponding HTML nodes for all subsequent tokenized words based on the behavior rules when no new markup command is determined to be present, and (iv) repeating (i) to (iii) with each remaining tokenized word of the inputted text data; collecting and building, using the one or more processors, an output tree based on the HTML nodes; rendering, using the one or more processors, each HTML node as a slide; and causing, using the one or more processors, a display of the computing device to display each slide, wherein each slide can be triggered to be made visible and invisible and take on behavior in accordance with the behavior rules, creating animated text.

The computer-implemented method may further comprise setting, using the one or more processors, a global time multiplier to 1; determining, using the one or more processors, a number of letters in a first word; assigning, using the one or more processors, a time delay of animating a second word based on the number of letters in a first word; and animating, using the one or more processors, the first word on the display followed by the second word on the display after the time delay. The computer-implemented method may further comprise assigning, using the one or more processors, a time delay of animating words following a punctuation mark; and animating, using the one or more processors, words following the punctuation mark on the display after the time delay.

The computer-implemented method may further comprise assigning, using the one or more processors, the text data to a root node; parsing, using the one or more processors, the root node into graph nodes, wherein a graph node is a paragraph, wherein a notation for a new paragraph is denoted by two consecutive newlines; parsing, using the one or more processors, the graph nodes into text blocks, wherein a text block comprise sentences within a quotation mark; parsing, using the one or more processors, the text blocks into token nodes, wherein each word is parsed into separate token nodes; and parsing, using the one or more processors, the token nodes into character nodes, wherein each character of the word is parsed into separate character nodes. Further, the markup command may correspond to the behavior rule of a markup command library.

The computer-implemented method may further comprise recording, using the one or more processors, a digital audio file of written text being vocalized; matching, using the one or more processors, the animating text by utilizing a recorder processor that analyzes the digital audio file for timing, amplitude, and pitch; and matching, using the one or more processors, the digital audio file with the animating text, to animate the animating text based on the digital audio file's pace and timing, volume, and pitch. The computer-implemented method may further comprise processing and aggregating, using the one or more processors, received data based on patterns of repeated use of certain markup commands for certain words or phrases, wherein a library database is built based on the received data. In addition, the present disclosure relates to a non-transitory computer-readable storage medium including computer executable instructions, wherein the computer executable instructions, when executed by a processor of a computing device, cause the computing device to perform the aforementioned aspects of the method.

BRIEF DESCRIPTION OF THE DRAWINGS

FIG. 5 illustrates a variation of a markup command table.

DETAILED DESCRIPTION

Detailed descriptions of aspects of the disclosure are provided herein. It is to be understood, however, that the present disclosure may be embodied in various forms. Therefore, the specific details disclosed herein are not to be interpreted as limiting, but rather as a representative basis for teaching one skilled in the art how to employ the present disclosure in virtually any detailed system, structure, or manner.

The present disclosure relates to a computer-implemented method for displaying animated text or multi-text wherein the user is easily able to segment and set animation styles and timing of the text such that the text appears according to a user's desired customizable settings. Various implementations of this disclosure may provide an easy solution to customize the animation of long pieces of standard, typed text, as further described below.

The present application incorporates by reference in their entireties the following patents: U.S. Pat. Nos. 5,873,109, 9,317,234, 9,553,840, 9,460,071, 9,424,254, and 9,542,926.

Some implementations of this disclosure may comprise certain computer programs written in one or more programming languages including the JAVA™ programming language, Javascript, or a combination thereof. More specifically, the methods and systems disclosed herein can allow a user who has little to no experience in computer programming to animate text in a simple yet highly customizable matter.

Figure 1:
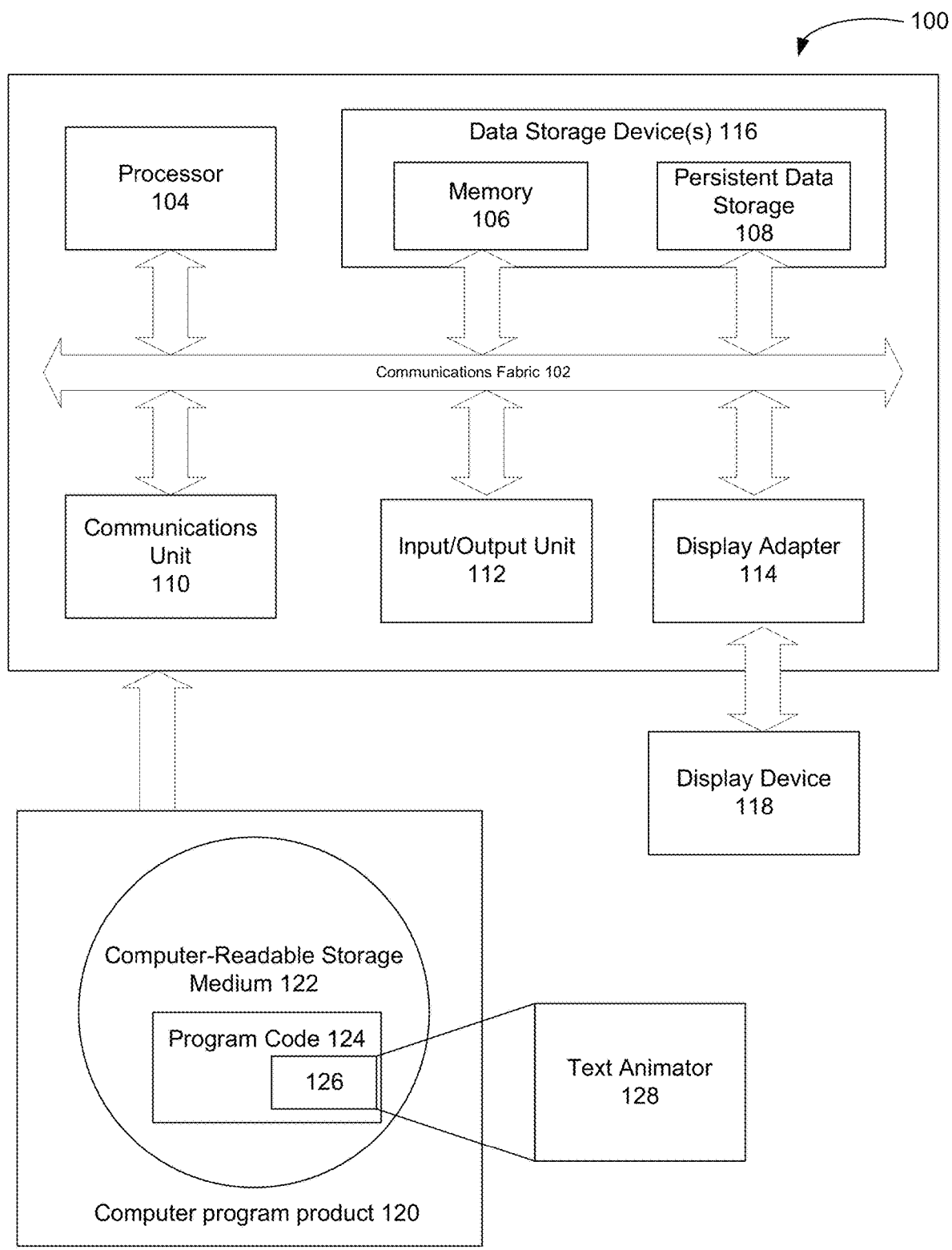
FIG. 1 is a block diagram of a variation of a computing device used to implement a customizable text animator.

FIG. 1 is a block diagram of a computing device 100 that can be used to implement text animation. The computing device 100 may be a computer or a server such as a web server or an application server. The computing device 100 may provide a virtual server that may be run from or incorporate any number of computing devices. The computing device 100 may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of the computing device 100 may include a computer having capabilities or formats other than or beyond those described herein.

The computing device 100 can include a communications fabric 102, which provides communications between one or more processor units 104, memory 106, a persistent data storage 108, a communications unit 110, and an input/output (I/O) unit 112. The communications fabric 102 may include a dedicated system bus, a general system bus, multiple buses arranged in hierarchical form, any other type of bus, bus network, switch fabric, or other interconnection technology. The communications fabric 102 supports transfer of data, commands, and other information between various subsystems of the computing device 100.

The processor unit 104 may be a programmable central processing unit (CPU) configured for executing programmed instructions stored in the memory 106. In another illustrative example, the processor unit 104 may be implemented using one or more heterogeneous processor systems in which a main processor is present with secondary processors on a single chip. In yet another illustrative example, the processor unit 104 may be a symmetric multi-processor system containing multiple processors of the same type. The processor unit 104 may include multiple processing chips on one die, and/or multiple dies on one package or substrate, for example. The processor unit 104 may also include one or more levels of integrated cache memory, for example. In various examples, the processor unit 104 may include one or more CPUs distributed across one or more locations.

The data storage 116 includes the memory 106 and the persistent data storage 108, which are in communication with the processor unit 104 through communications fabric 102. The memory 106 can include a random access semiconductor memory (RAM) for storing application data, i.e., computer program data, for processing. While the memory 106 is depicted conceptually as a single monolithic entity, in various examples, memory 106 may be arranged in a hierarchy of caches and in other memory devices, in a single physical location, or distributed across a plurality of physical systems in various forms. While the memory 106 is depicted physically separated from the processor unit 104 and other elements of the computing device 100, the memory 106 may refer equivalently to any intermediate or cache memory at any location throughout the computing device 100, including cache memory proximate to or integrated with the processor unit 104 or individual cores of the processor unit 104.

The persistent data storage 108 may include one or more hard disc drives, solid state drives, flash drives, rewritable optical disc drives, magnetic tape drives, or any combination of these or other data storage media. The persistent data storage 108 may store computer-executable instructions or computer-readable program code for an operating system, application files including program code, data structures or data files, and any other type of data. These computer-executable instructions may be loaded from the persistent data storage 108 into the memory 106 to be read and executed by the processor unit 104 or other processors. The data storage 116 may also include any other hardware elements capable of storing information, such as, for example and without limitation, data, program code in functional form, and/or other suitable information on a temporary basis and/or a permanent basis.

The persistent data storage 108 and the memory 106 are examples of computer-readable hardware storage devices. The data storage 116 may include any of various forms of volatile memory that may require being periodically electrically refreshed to maintain data in memory, while those skilled in the art will recognize that this also constitutes an example of a computer-readable hardware storage device. Executable instructions may be stored on a computer-readable hardware storage device when program code is loaded, stored, relayed, buffered, or cached on a computer-readable hardware storage device, including if only for only a short duration or only in a volatile memory format. The processor unit 104 can also be suitably programmed to read, load, and execute computer-executable instructions or computer-readable program code for text animation, as described in greater detail below.

FIG. 1 illustrates that a program code 124 can include a text animating software 126 for implementing a text animator 128 on a computing device 100. The program code 124 may be stored on the memory 106, the persistent data storage 108, or elsewhere in computing device 100. The program code 124 may also take the form of program code 124 stored on a computer-readable medium 122 comprised in a computer program product 120, and may be transferred or communicated, through any of a variety of local or remote means, from the computer program product 120 to the computing device 100 to be enabled to be executed by processor unit 104, as further explained below.

The operating system may provide functions such as device interface management, memory management, and multiple task management. The operating system can be a Unix based operating system such as the AIX® operating system from IBM® Corporation or Linux, a non-Unix based operating system such as the Windows® family of operating systems from Microsoft® Corporation, the Macintosh family of operating systems from Apple® Inc., a network operating system such as the JAVA™ operating system from Oracle® Corporation, or any other suitable operating system. Processor unit 104 may be suitably programmed to read, load, and execute instructions of the operating system.

The communications unit 110 can provide for communications with other computing or communications systems or devices. The communications unit 110 may provide communications through the use of physical and/or wireless communications links. The communications unit 110 may include a network interface card for interfacing with a LAN, an Ethernet adapter, a Token Ring adapter, a modem for connecting to a transmission system such as a telephone line, or any other type of communication interface. The communications unit 110 can be used for operationally connecting many types of peripheral computing devices to the computing device 100, such as printers, bus adapters, and other computers. The communications unit 110 may be implemented as an expansion card or be built into a motherboard, for example.

The input/output unit 112 can support devices suited for input and output of data with other devices that may be connected to the computing device 100, such as a keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. The input/output unit 112 may also include any type of interface for video output in any type of video output protocol and any type of monitor or other video display technology, in various examples. It will be understood that some of these examples may overlap with each other, or with example components of the communications unit 110 or the data storage 116. The input/output unit 112 may also include appropriate device drivers for any type of external device, or such device drivers may reside elsewhere on the computing device 100 as appropriate.

The computing device 100 can also include a display adapter 113 in this illustrative example, which provides one or more connections for one or more display devices, such as a display 118, which may include any of a variety of types of display devices. It will be understood that some of these examples may overlap with example components of the communications unit 110 or the input/output unit 112. The input/output unit 112 may also include appropriate device drivers for any type of external device, or such device drivers may reside elsewhere on the computing device 100 as appropriate. The display adapter 114 may include one or more video cards, one or more graphics processing units (GPUs), one or more video-capable connection ports, or any other type of data connector capable of communicating video data, in various examples. The display adapter 114 also allows a user to create a specific desired output format, such as apps for mobile devices or files that can be used on webpages. The display 118 may be any kind of video display device, such as a monitor, a television, or a projector, in various examples.

In real-time, the display 118 can display a true-to-life view of the animated multi-text with any corresponding media a user has added. The display 118 can be adjusted to display different device screen sizes and resolutions, to allow the user to see what multi-text outputs look like on different devices and displays.

The input/output unit 112 may include a drive, socket, or outlet for receiving the computer program product 120, which comprises the computer-readable medium 122 having the computer program code 124 stored thereon. For example, the computer program product 120 may be a CD-ROM, a DVD-ROM, a Blu-Ray disc, a magnetic disc, a USB stick, a flash drive, or an external hard disc drive, as illustrative examples, or any other suitable data storage technology.

The computer-readable storage medium 122 may include any type of optical, magnetic, or other physical medium that physically encodes the program code 124 as a binary series of different physical states in each unit of memory that, when read by the computing device 100, induces a physical signal that is read by the processor 104 that corresponds to the physical states of the basic data storage elements of the computer-readable storage medium 122, and that induces corresponding changes in the physical state of the processor unit 104. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of the processor unit 104, thereby physically causing or configuring the processor unit 104 to generate physical outputs that correspond to the computer-executable instructions, in a way that causes computing device 100 to physically assume new capabilities that it did not have until its physical state was changed by loading the executable instructions comprised in the program code 124.

The program code 124 may be downloaded over a network to the data storage 116 from another device or computer system for use within the computing device 100. The program code 124 comprising computer-executable instructions may be communicated or transferred to the computing device 100 from the computer-readable medium 122 through a hard-line or wireless communications link to the communications unit 110 and/or through a connection to the input/output unit 112. The computer-readable medium 122 comprising the program code 124 may be located at a separate or remote location from the computing device 100, and may be located anywhere, including at any remote geographical location anywhere in the world, and may relay the program code 124 to the computing device 100 over any type of one or more communication links, such as the Internet and/or other packet data networks. The program code 124 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and the program code 124 may be transmitted from a source computer-readable medium 122 over non-tangible media, such as communications links or wireless transmissions containing the program code 124. The program code 124 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to the computing device 100.

Figure 2:
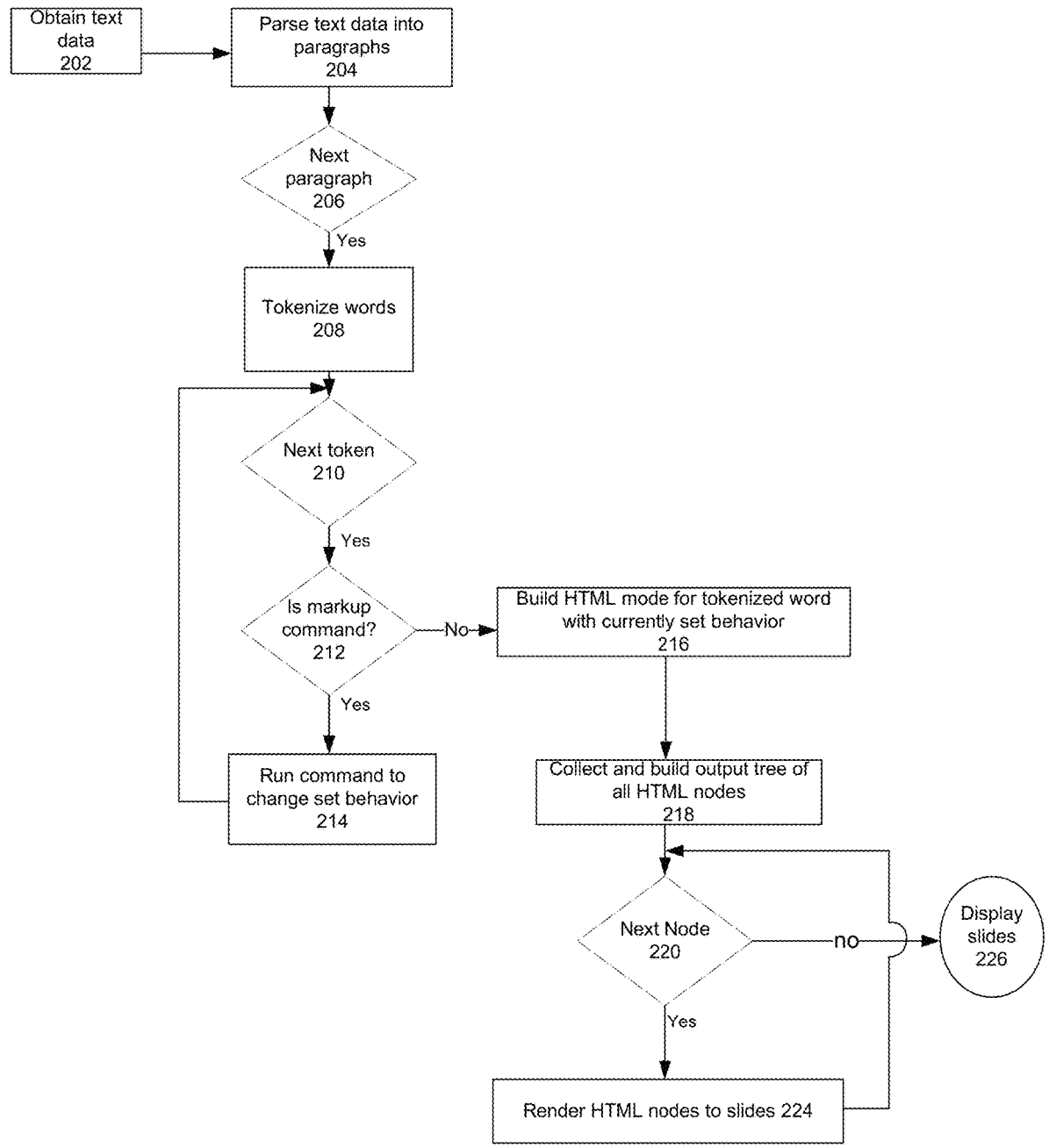
FIG. 2 depicts a flowchart of an example process that a text animator, executing on one or more computing devices (e.g., servers, computers, processors, etc.), may perform.

FIG. 2 depicts a flowchart of an example process that the text animator 128, executing on one or more computing devices 100 (e.g., servers, computers, processors, etc.), may perform. The text animator 128 can obtain, using the one or more processors, digital data comprising text data (202) pasted in a smart text editor 300, where users (or operators) can copy and paste previously written text, or type in new text. Users can also add (or select) markup commands ("markup controls" or "software controls") (see examples in FIG. 5) inline with standard written text to: prescribe properties of multi-text animations, and add multi-text shapes, media, and actions—on a word-by-word or character-by-character basis, for example.

The text animator 128 can automatically parse, using the one or more processors, the text data into at least one paragraph (204, 206), wherein the at least one paragraph comprises a set of words and markup commands. Then, the text animator 128 can automatically tokenize, using the one or more processors, each word of the set of words creating a stream of tokenized words (208) comprising at least one tokenized word comprising a markup command, wherein the markup command dictates a behavior rule of the at least one tokenized word. Then, the text animator 128 can scan, using the one or more processors, through the stream of tokenized words (210), wherein scanning the stream of tokenized words comprises: determining if a markup command is present (212), building HTML nodes for all subsequent tokenized words based on the behavior rule when the pre-existing markup command is determined to be present (216), at least one of replacing the pre-existing markup command with the new markup command and adding the new markup command to the preexisting markup command when the new markup command is determined to be present (214), building corresponding HTML nodes for all subsequent tokenized words based on the behavior rules (218), and repeating (i) to (iii) with each remaining tokenized word of the inputted text data. Then, the text animator 128 collects and builds, using the one or more processors, an output tree based on the HTML nodes (218), renders, using the one or more processors, each HTML node as a slide (224); and causes, using the one or more processors, the display of the computing device to display each slide (226), wherein each slide can be triggered to be made visible and invisible and take on a behavior in accordance with the behavior rules in order to create animated text. In some example approaches, prior to tokenizing the words (208), the text animator 128 automatically parses the text data into at least one paragraph (206), wherein the at least one paragraph comprises a set of words, wherein a notation for a new paragraph may be denoted by two consecutive newlines as the notion for a change of paragraph.

In rendering each HTML node as a slide, each slide may be a HTML div node, and a published HTML may comprise of a trigger, such as a JavaScript trigger for when the user interacts with the slide or simple timers, that automatically toggles the visibility of the slides making one visible and the other invisible, such that when a slide becomes visible, an animated style, such as a CSS style, applied to each node animate in as per the timing values of each of those nodes. Nodes can mean individual characters or words or sentences depending on the affect the author is trying to achieve.

Figure 3A:
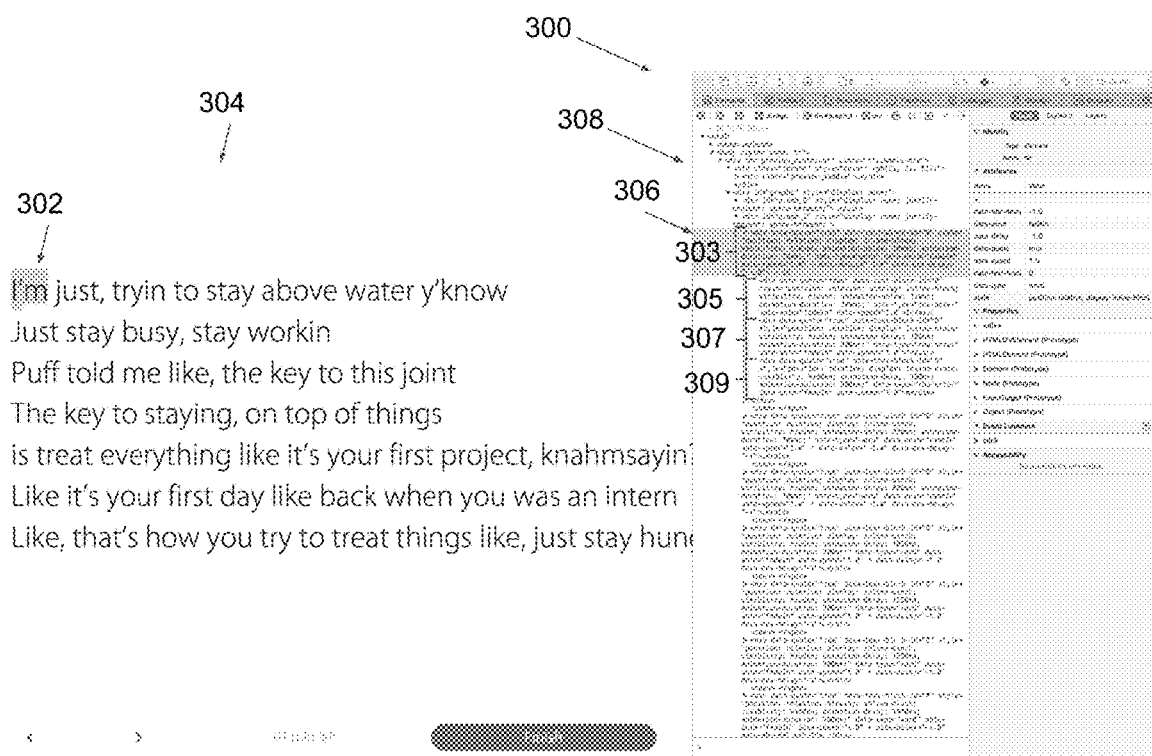
FIGS. 3A and 3B are example screenshots of backend code depicting how text is parsed.

FIG. 3A depicts an exemplary text parser 300 that can detect specific punctuation, such as periods, commas, exclamation points, or combinations thereof, as well as a length of a previous word, to annotate particular timing values. With no other context available, and assuming a global speed multiplier of 1 (can be adjusted by the user to go faster or slower), an animation delay for a next word depends on a length of the previous word, the punctuation that follows the previous word—or the lack of it, and whether the words appear within quotes. These animation delays are then chained together to provide a natural reading experience. As shown in FIG. 3A by way of example, "I'm" 302 is highlighted on a preview screen 304 and corresponding code 306 is highlighted in a code screen 308. The corresponding code 306, by way of example, shows a token node 303 for "I'm" 302, having three characters, wherein each character is assigned an animation duration time of 300 ms and wherein the "I" character node 305 is coded to have an animation delay time of 110 ms, the apostrophe character node 307 has an animation delay time of 120 ms, and the "m" character node 309 has an animation delay time of 130 ms. It follows that the following word "just" is then delayed by another 100 ms as a default setting for a space between "I'm" and "just" such that the animation delay time is 230 ms. The animation delay time is a timing offset relative to the first character and will be monotonically increasing for a text block. The animation duration is set at 700 ms for each token node, wherein the animation duration is an amount of time the animation takes from start to end, which is generally a constant.

Figure 3B:
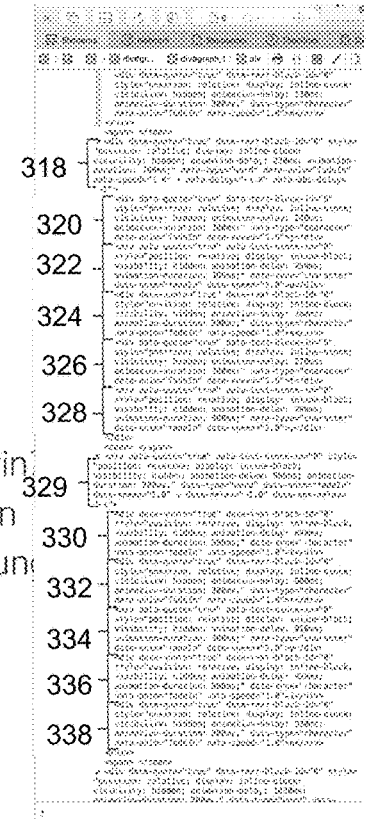

As shown in FIG. 3B, by way of example, the word "just," 317 corresponds to a first token node 318 parsed into five character nodes (the comma comprising its own character node) wherein each character is assigned an animation duration time of 300 ms and wherein a "j" character node 320 is coded to have an animation delay time of 240 ms, a "u" character node 322 is coded to have an animation delay time of 250 ms, a "s" character node 324 is coded to have an animation delay time of 260 ms, a "t" character node 326 is coded to have an animation delay time of 270 ms, and a comma character node 328 is coded to have an animation delay time of 280 ms. It follows that the following word "tryin" is then delayed by another 600 ms as a default setting for a space between "just" and "tryin", such that "tryin" corresponds to a second token node 329 is parsed into five character notes wherein each character is assigned the animation duration time of 300 ms and wherein a "t" character node 330 is coded to have an animation delay time of 890 ms, a "r" character node 332 is coded to have an animation delay time of 890 ms, a "y" character node 334 is coded to have an animation delay time of 900 ms, a "i" character node 336 is coded to have an animation delay time of 910 ms, and a "n" character node 338 is coded to have an animation delay time of 920 ms. Again, the animation delay time is a timing offset relative to the first character and will be monotonically increasing for a text block.

Figure 4:
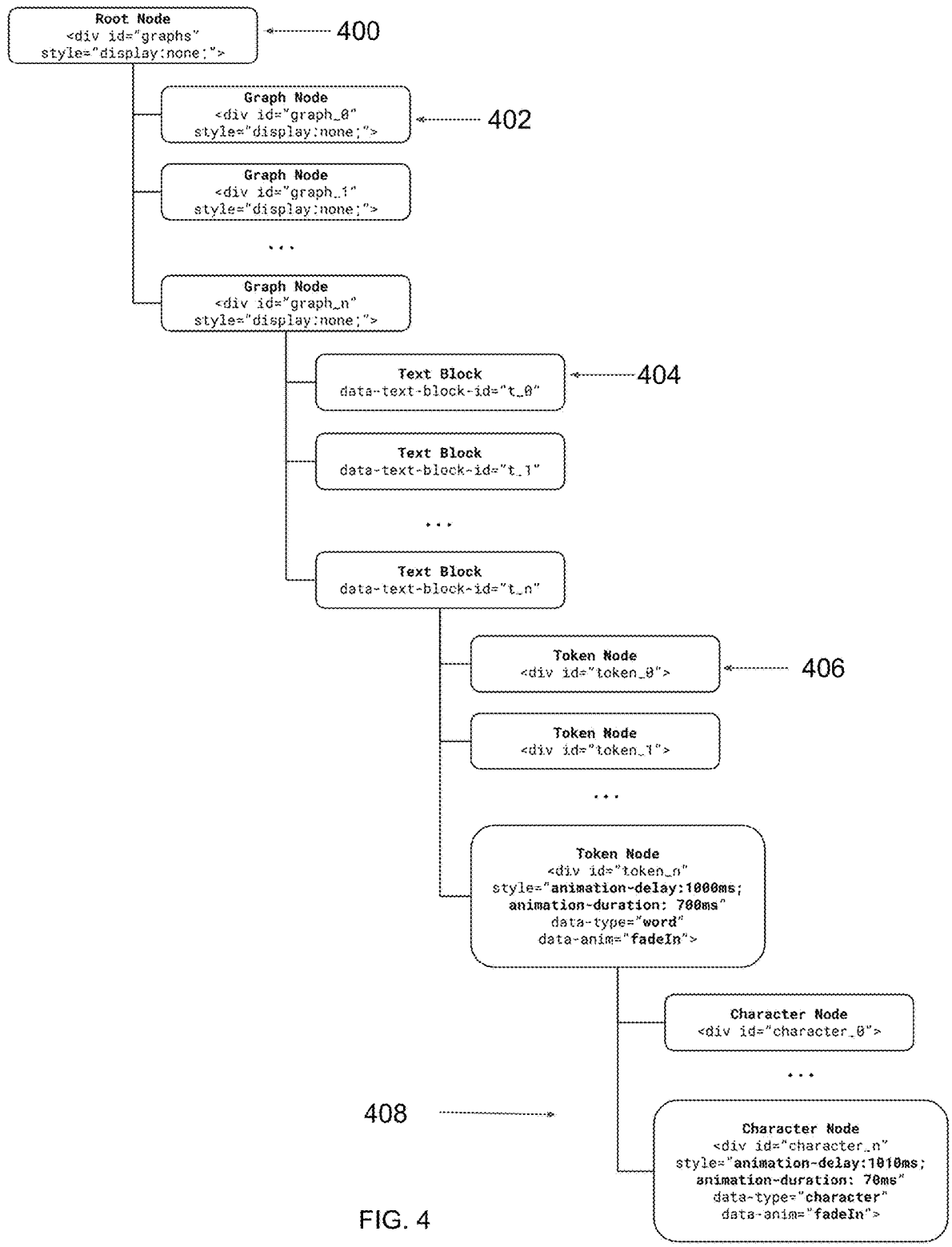
FIG. 4 depicts an example block diagram of an output tree based on built HTML nodes.

FIG. 4 is a generic block diagram of an output tree based on built HTML nodes. The inputted text data is set as a root node 400, which is collection of graph nodes 402, each of which is a collection of text blocks 404, each of which is a collection of token nodes 406, which lastly is a collection of character nodes 408. The text parser 300 generates this tree such that the root node 400 corresponds to the inputted text data and hierarchically splits them into the eventual character nodes 408. Tokens are essentially words in a textual stream or commands that are explicitly marked inline. These words are sometimes grouped together into textual blocks 404, roughly sentences or groups of sentences depending on whether there is a "dialog" detected in the paragraph, meaning that there are sentences that are grouped together because they are all within a set of quotation marks. A collection of these textual blocks, usually a paragraph is a graph node 402.

FIG. 5 is an example table of markup commands and the animation behaviors of the words that follow the markup command as inputted into the smart text editor 300. For example, inputting 'wordAnim:fadeinUP' 610 in front of the text "sweat it out" displays those words fading in an upward movement as shown in FIG. 6G. As another example, also inputting 'charAnim:rotateIn' 612 along with 'worrdAnim:fadeinUP' 610 in front of the text "When I was a kid . . . " will displays the text not only fading in an upward movement but also with each character rotating in as shown in FIG. 6H.

Figure 6A:
FIGS. 6A-6J depict a variation of how inputting certain markup commands in the smart editor affect how the text is displayed and animated on the viewer.
Figure 6B:
Figure 6C:
Figure 6D:
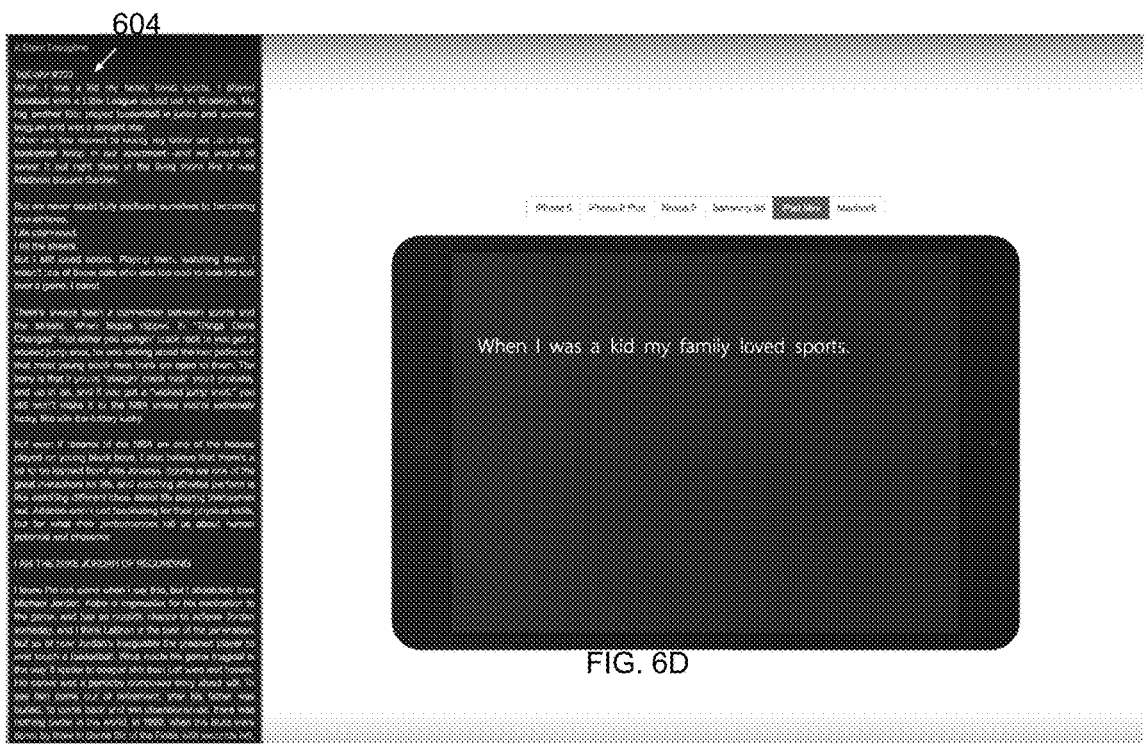
Figure 6E:
Figure 6F:
Figure 6G:
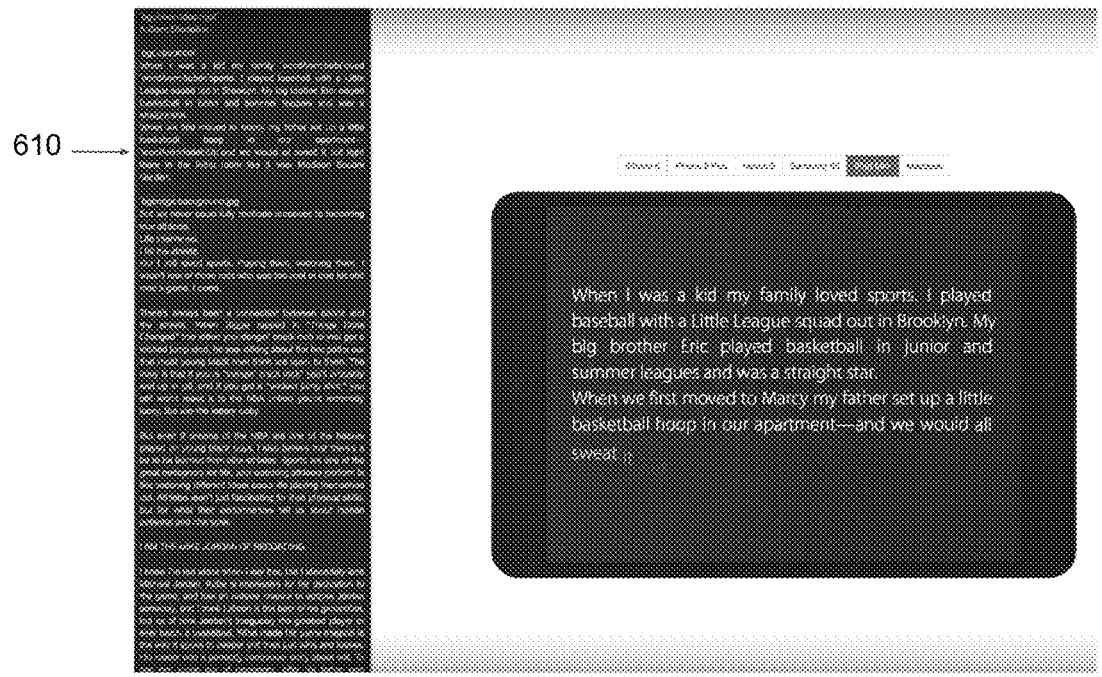
Figure 6H:
Figure 6I:
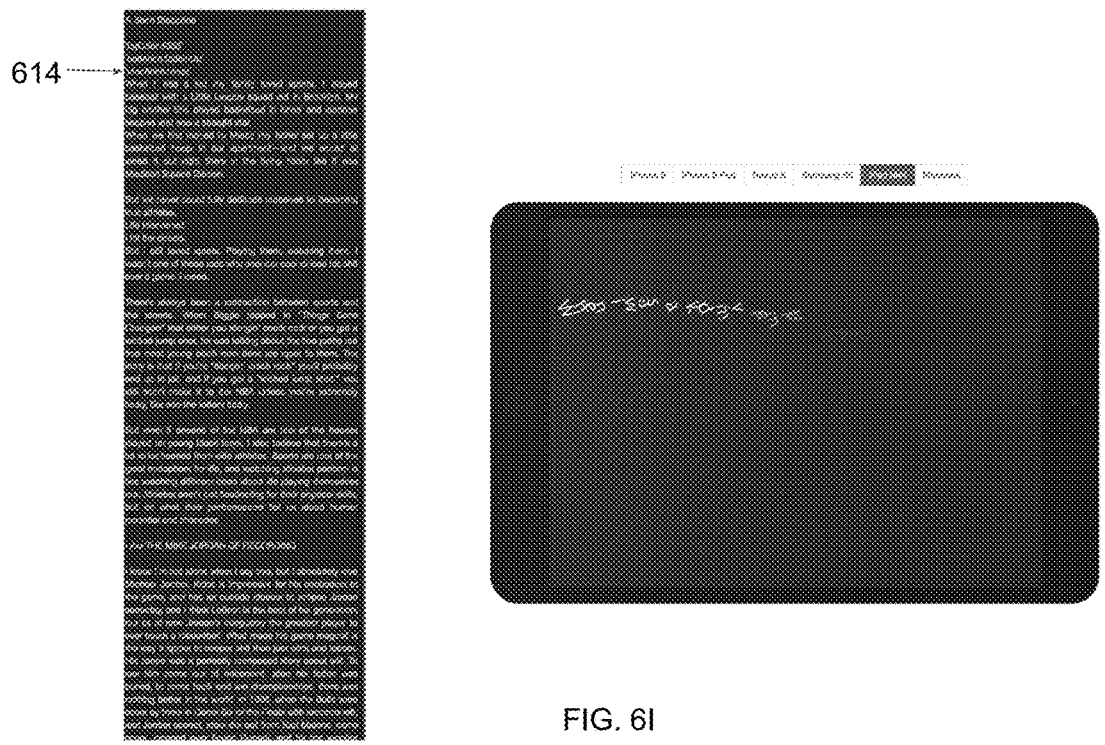
Figure 6J:
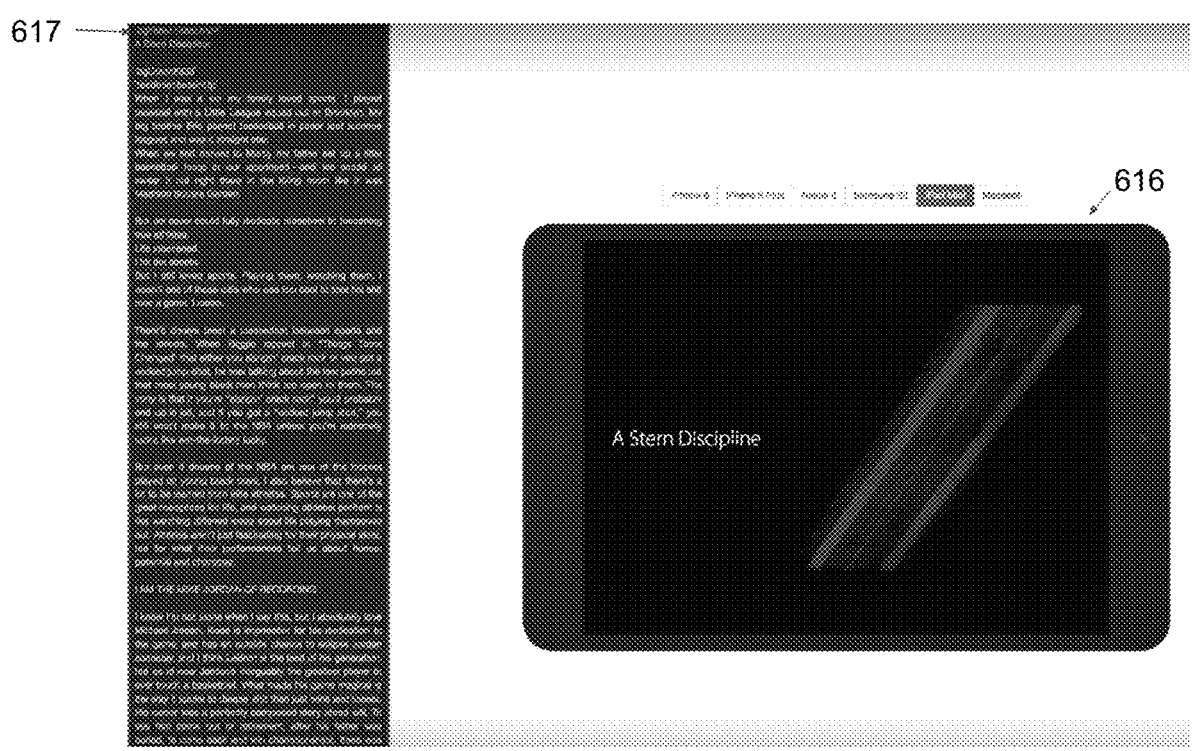

FIGS. 6A-6J show screenshot views of the smart text editor 300 and inputted text data 600 and markup commands into the smart text editor 300 and the display 118. FIGS. 6A and 6B show how text data 600 can be copied and pasted into the smart text editor 300. FIG. 6C shows as a default animation setting 602, without any markup commands present, the text data 600 can appear on the display 118, one word at a time fading in with a delay that captures a natural reading experience. FIG. 6D shows inputting 'bgColor: #333' 604 can set the background color as a hex color of #333333 of the RGB color space. FIG. 6E shows that a second paragraph 606 may be animated to appear at a delayed time and that a 'delay:2000' markup command 618 may be used to delay the speed of animating each word that follows by 2000 milliseconds, change the speed again by adding a 'delay:0' markup command 620 that may be used to delay the speed of animating each word that follows by 0 seconds, and then a 'reset' markup command 622 changes the speed back to a default setting. FIG. 6F shows that inputting 'bgColor:red' 608 can set the background color as red. FIG. 6G shows that a 'wordAnim:fadeinUP' markup command 610 may be added in the middle of a paragraph such that the words following the 'wordAnim:fadeinUP' markup command 610 is displayed faded in and in an upward movement. FIGS. 6H and 6I shows that in addition to the 'wordAnim:fadeinUP' markup command 610, characters may also be animated, for example, to rotate in via a 'charAnim:rotate' markup command 612 or a 'charAnim:hinge' markup command 614. FIG. 6J shows that a video 616 may be played in the background if a 'bgVideo:video.mp4' markup command 617 is inputted into the smart text editor 300, wherein the video 616 may be linked to a file locatable on a local drive or on a cloud-based server.

A user may input speech and based on the volume and timing of the user's speech pattern, the text 600 may appear on the display 118 with animated features and delays that match the input speech. A recorder of the input/output (I/O) unit 112 may capture a digital audio file of written text being vocalized (read or sung, for example), and a speech-to-text module of the program code 124 matches the text in the smart text editor 300. The speech-to-text module engages the processor unit 104 to analyze the recorded audio for timing, amplitude, and pitch. The speech-to-text module matches an operator's recorded audio file with typed text, to change properties of the animated text based on the recorded file's pace and timing, volume, and pitch. Default animated text properties can be set in the speech-to-text module, or defined by an operator. For example, an operator uses the recorder of the input/output (I/O) unit 112 to record a vocalist reading a speech, which has previously been entered in the smart text editor 300. The speech-to-text module processes that recorded audio file, and informs the text animator 128 to slow down the animation of multi-text seen in the display 118 based on the slow pace of the vocalist. Or the operator may define low volume to indicate that animated text should appear at the bottom of the screen, in a small font, which would then be displayed in the display 118 as such. Another example would be a vocalist recording a song in the recorder of the input/output (I/O) unit 112, in which the timing and animation styles of the accompanying multi-text version of the song's lyrics, would match the timing and volume of the vocalist's recorded audio.

Any animated text project created by this method and output on digital devices and displays, can communicate with a centralized server that aggregates and processes consumer-use data, and delivers it to a feedback module of the program code 124. The feedback module processes data received, and presents recommendations, notes, and options to operators, for the creation and editing of current and future multi-text projects. The feedback module also may allow customized multi-text projects, per consumer. For instance, if a consumer prefers more rich media experiences in one multi-text project, subsequent multi-text projects for that consumer can default to providing more rich media experiences. In other instances, the feedback module works to link consumers who are known by one another (on social media platforms or as expressed in other ways), to share their thoughts and feedback on parts or all of the multi-text project. Consumers can view comments, emoji's, and emoticons, for example, from one another, if they view the same multi-text projects as people in their network. In this way, a social community of consumers can be formed, to allow for sharing of thoughts and ideas directly within multi-text projects.

The text data 600 may be displayed as formatted 2D or 3D shapes, objects, or designs ("multi-text shapes") that enhance the animated text. These objects can build in, move, transform in property (such as style, texture, and color), and build out, over time. Media that enhances the animated text ("multi-text media"), such as music, sounds, photos, video, augmented-reality elements and objects, and virtual-reality elements and objects that build in, move, transform, and build out, over time. Engagements, interactions, and actions from consumers of multi-text projects ("multi-text actions"), such as touch-screen interactions and actions, device or display actions, and actions in augmented- and virtual-reality environments. Multi-text projects can be created from any standard written text (and other media projects that include text), such as: fiction and non-fiction books, religious texts, apps and games, websites, business or government documents, song lyrics, films and television shows, music albums with liner notes, speeches and presentations, social media posts, and advertising. Multi-text projects can be created and viewed in real-time, then encoded for consumption on digital devices and displays, including but not limited to: computers, televisions, mobile devices, theater screens, digital billboards, and augmented- and virtual-reality environments.

The method as disclosed may provide operators the ability to quickly and intuitively create multi-text projects for real-time viewing and output to digital devices and displays. It can also be integrated into other existing platforms such as websites, social media platforms, and other digital media authoring tools. This method is particularly useful for segmenting long pieces of standard, typed text (greater than 250 words) over multiple screens based on standard written text characteristics, with minimal work from an operator. This allows long pieces of text to be logically segmented and legibly displayed as multiple screens of multi-text, rather than as one large block of unreadable, small-font text, or as text that doesn't fit on one screen. The method as disclosed may provide can be packaged as standalone software that can be licensed and distributed to creators of multi-text projects (such as authors, publishers, artists, content owners/creators). For instance, an author, or book publisher, obtains a software copy and license to create a multi-text project from a previously written work. Or a musician obtains a software copy and license to create a new multi-text project that accompanies a new music album. The method as disclosed can be packaged or integrated for use on other software platforms. For instance, a website company wants to provide its users the capability to create multi-text projects on its website—this method could be integrated and licensed to that website owner.

A number of aspects have been described. Nevertheless, it will be understood by one of ordinary skill in the art that various modifications may be made without departing from the spirit and scope of the aspects. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other aspects are within the scope of the following claims.

Each of the individual variations or aspects described and illustrated herein has discrete components and features which may be readily separated from or combined with the features of any of the other variations or aspects. Modifications may be made to adapt a particular situation, material, composition of matter, process, process act(s) or step(s) to the objective(s), spirit or scope of the present disclosure.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the disclosure. Also, any optional feature of the inventive variations described may be set forth and claimed independently, or in combination with any one or more of the features described herein.

All existing subject matter mentioned herein (e.g., publications, patents, patent applications and hardware) are incorporated by reference herein in its entirety except insofar as the subject matter may conflict with that of the present disclosure (in which case what is present herein shall prevail). The referenced items are provided solely for their disclosure prior to the filing date of the present application. Nothing herein is to be construed as an admission that the present disclosure is not entitled to antedate such material by virtue of prior disclosure.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this disclosure belongs.

This disclosure is not intended to be limited to the scope of the particular forms set forth, but is intended to cover alternatives, modifications, and equivalents of the variations or aspects described herein. Further, the scope of the disclosure fully encompasses other variations or aspects that may become obvious to those skilled in the art in view of this disclosure.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A non-transitory computer-readable storage medium including computer executable instructions, wherein the computer executable instructions, when executed by one or more processors of a computing device, cause the computing device to:

obtain, using the one or more processors, digital content comprising text data via a smart text editor, the text data comprising a plurality of words and a set of individual characters, wherein at least a portion of the individual characters make up the words;

automatically parse, using the one or more processors, the text data into at least one paragraph, wherein the at least one paragraph comprises a set of words;

automatically tokenize, using the one or more processors, each word of the set of words, creating a stream of tokenized words comprising at least one tokenized word comprising a markup command, wherein the markup command dictates a behavior rule of the at least one tokenized word;

scan, using the one or more processors, the stream of tokenized words, wherein scanning the stream of tokenized words comprises the steps of:
  (i) building HTML nodes for all subsequent tokenized words based on a pre-existing behavior rule when the pre-existing markup command is determined to be present,
  (ii) at least one of replacing the pre-existing markup command with a new markup command and adding the new markup command to the pre-existing markup command when the new markup command is determined to be present,
  (iii) building corresponding HTML nodes for all subsequent tokenized words based on the behavior rules when no new markup command is determined to be present, and
  (iv) repeating (i) to (iii) with each remaining tokenized word of the inputted text data;

collect and build, using the one or more processors, an output tree based on the HTML nodes, wherein building the output tree comprises the steps of:
  (i) assigning, using the one or more processors, the text data to a root node,
  (ii) parsing, using the one or more processors, the root node into graph nodes, wherein a graph node is a paragraph, wherein a notation for a new paragraph is denoted by two consecutive newlines,
  (iii) parsing, using the one or more processors, the graph nodes into text blocks, wherein a text block comprise sentences within a quotation mark,
  (iv) parsing, using the one or more processors, the text blocks into token nodes, wherein each word is parsed into separate token nodes, and
  (v) parsing, using the one or more processors, the token nodes into character nodes, wherein each character of the word is parsed into separate character nodes;

render, using the one or more processors, each HTML node as a slide; and cause, using the one or more processors, a display of the computing device to display each slide, wherein each slide is triggered to be made visible and invisible and take on behavior in accordance with the behavior rules resulting in animated text, the animated text is rendered based on the separate token nodes corresponding to the words and the separate character nodes corresponding to the characters of the text data.

2. The one or more non-transitory computer-readable media of claim 1 further comprising additional instructions, when executed by the one or more processors of the computing device, that cause the computing device to:

set, using the one or more processors, a global time multiplier to 1;

determine, using the one or more processors, a number of letters in a first word;

assign, using the one or more processors, a time delay of animating a second word based on the number of letters in a first word; and animate, using the one or more processors, the first word on the display followed by the second word on the display after the time delay.

3. The one or more non-transitory computer-readable media of claim 1 further comprising additional instructions, when executed by the one or more processors of the computing device, that cause the computing device to:

assign a time delay of animating words following a punctuation mark; and animate words following the punctuation mark on the display after the time delay.

4. The one or more non-transitory computer-readable media of claim 1 further comprising additional instructions, when executed by the one or more processors of the computing device, that cause the computing device to add a video that plays behind the animating text on the display.

5. The one or more non-transitory computer-readable media of claim 1 further comprising additional instructions, when executed by the one or more processors of the computing device, that cause the computing device to add a sound recording that plays while the animated text appear on the display.

6. The one or more non-transitory computer-readable media of claim 1 wherein the markup command corresponds to the behavior rule of a markup command library.

7. The one or more non-transitory computer-readable media of claim 6, wherein the markup command library comprises commands selected from the group consisting of: 'bgImage', 'bgColor', 'bgVideo', 'bgAudio', 'globalAudio', 'textColor', 'wordAnim', 'charAnim', 'setSpeed', 'delay', 'absDelay', 'newline', 'wait', and 'textBehavior'.

8. The one or more non-transitory computer-readable media of claim 1 further comprising additional instructions, when executed by the one or more processors of the computing device, that cause the computing device to:

record, using the one or more processors, a digital audio file of written text being vocalized;

match, using the one or more processors, the animating text by utilizing a recorder processor that analyzes the digital audio file for timing, amplitude, and pitch; and match, using the one or more processors, the digital audio file with the animating text, to animate the animating text based on the digital audio file's pace and timing, volume, and pitch.

9. The one or more non-transitory computer-readable media of claim 1 further comprising additional instructions, when executed by the one or more processors of the computing device, that cause the computing device to perform the additional steps of processing and aggregating, using the one or more processors, received data based on patterns of repeated use of certain markup commands for certain words or phrases, wherein a library database is built based on the received data.

10. A computer-implemented method comprising:

obtaining, using one or more processors of a computing device, digital content comprising text data via a smart text editor, the text data comprising a plurality of words and a set of individual characters, wherein at least a portion of the individual characters make up the words;

automatically parsing, using the one or more processors, the text data into at least one paragraph, wherein the at least one paragraph comprises a set of words;

automatically tokenizing, using the one or more processors, each word of the set of words, creating a stream of tokenized words comprising at least one tokenized word comprising a markup command, wherein the markup command dictates a behavior rule of the at least one tokenized word;

scanning, using the one or more processors, the stream of tokenized words, wherein scanning the stream of tokenized words comprises:

(i) building HTML nodes for all subsequent tokenized words based on a pre-existing behavior rule when the pre-existing markup command is determined to be present, (ii) at least one of replacing the pre-existing markup command with a new markup command and adding the new markup command to the pre-existing markup command when the new markup command is determined to be present, (iii) building corresponding HTML nodes for all subsequent tokenized words based on the behavior rules when no new markup command is determined to be present, and (iv) repeating (i) to (iii) with each remaining tokenized word of the inputted text data;

collecting and building, using the one or more processors, an output tree based on the HTML nodes, wherein building the output tree comprises the steps of:

(i) assigning, using the one or more processors, the text data to a root node, (ii) parsing, using the one or more processors, the root node into graph nodes, wherein a graph node is a paragraph, wherein a notation for a new paragraph is denoted by two consecutive newlines, (iii) parsing, using the one or more processors, the graph nodes into text blocks, wherein a text block comprise sentences within a quotation mark, (iv) parsing, using the one or more processors, the text blocks into token nodes, wherein each word is parsed into separate token nodes, and (v) parsing, using the one or more processors, the token nodes into character nodes, wherein each character of the word is parsed into separate character nodes;

rendering, using the one or more processors, each HTML node as a slide; and causing, using the one or more processors, a display of the computing device to display each slide, wherein each slide is triggered to be made visible and invisible and take on behavior in accordance with the behavior rules resulting in animated text, the animated text is rendered based on the separate token nodes corresponding to the words and the separate character nodes corresponding to the characters of the text data.

11. The computer-implemented method of claim 10, further comprising:

setting, using the one or more processors, a global time multiplier to 1;

determining, using the one or more processors, a number of letters in a first word;

assigning, using the one or more processors, a time delay of animating a second word based on the number of letters in a first word; and animating, using the one or more processors, the first word on the display followed by the second word on the display after the time delay.

12. The computer-implemented method of claim 10 further comprising:

assigning, using the one or more processors, a time delay of animating words following a punctuation mark; and animating, using the one or more processors, words following the punctuation mark on the display after the time delay.

13. The computer-implemented method of claim 10 wherein the markup command corresponds to the behavior rule of a markup command library.

14. The computer-implemented method of claim 10 further comprising:

recording, using the one or more processors, a digital audio file of written text being vocalized;

matching, using the one or more processors, the animating text by utilizing a recorder processor that analyzes the digital audio file for timing, amplitude, and pitch; and matching, using the one or more processors, the digital audio file with the animating text, to animate the animating text based on the digital audio file's pace and timing, volume, and pitch.

15. The computer-implemented method of claim 10 further comprising processing and aggregating, using the one or more processors, received data based on patterns of repeated use of certain markup commands for certain words or phrases, wherein a library database is built based on the received data.

16. A computing device comprising:

a memory having computer readable instructions stored thereon;

a display; and one or more processors configured to execute the computer readable instructions to:

obtain, using the one or more processors of a computing device, digital content comprising text data via a smart text editor, the text data comprising a plurality of words and a set of individual characters, wherein at least a portion of the individual characters make up the words;

automatically parse, using the one or more processors, the text data into at least one paragraph, wherein the at least one paragraph comprises a set of words;

automatically tokenize, using the one or more processors, each word of the set of words, creating a stream of tokenized words comprising at least one tokenized word comprising a markup command, wherein the markup command dictates a behavior rule of the at least one tokenized word;

scan, using the one or more processors, the stream of tokenized words, wherein scanning the stream of tokenized words comprises:

(i) building HTML nodes for all subsequent tokenized words based on a pre-existing behavior rule when the pre-existing markup command is determined to be present, (ii) at least one of replacing the pre-existing markup command with a new markup command and adding the new markup command to the pre-existing markup command when the new markup command is determined to be present, (iii) building corresponding HTML nodes for all subsequent tokenized words based on the behavior rules when no new markup command is determined to be present, and (iv) repeating (i) to (iii) with each remaining tokenized word of the inputted text data;

collect and build, using the one or more processors, an output tree based on the HTML nodes, wherein building the output tree comprises the steps of:

(i) assigning, using the one or more processors, the text data to a root node, (ii) parsing, using the one or more processors, the root node into graph nodes, wherein a graph node is a paragraph, wherein a notation for a new paragraph is denoted by two consecutive newlines, (iii) parsing, using the one or more processors, the graph nodes into text blocks, wherein a text block comprise sentences within a quotation mark, (iv) parsing, using the one or more processors, the text blocks into token nodes, wherein each word is parsed into separate token nodes, and (v) parsing, using the one or more processors, the token nodes into character nodes, wherein each character of the word is parsed into separate character nodes;

render, using the one or more processors, each HTML node as a slide; and cause, using the one or more processors, a display of the computing device to display each slide, wherein each slide is triggered to be made visible and invisible and take on behavior in accordance with the behavior rules resulting in animated text, the animated text is rendered based on the separate token nodes corresponding to the words and the separate character nodes corresponding to the characters of the text data.

17. The computing device of claim 16, wherein the at least one processor is configured to execute the computer readable instructions to:

set, using the one or more processors, a global time multiplier to 1;

determine, using the one or more processors, a number of letters in a first word;

assign, using the one or more processors, a time delay of animating a second word based on the number of letters in a first word; and animate, using the one or more processors, the first word on the display followed by the second word on the display after the time delay.

* * * * *